Patented Nov. 11, 1924.

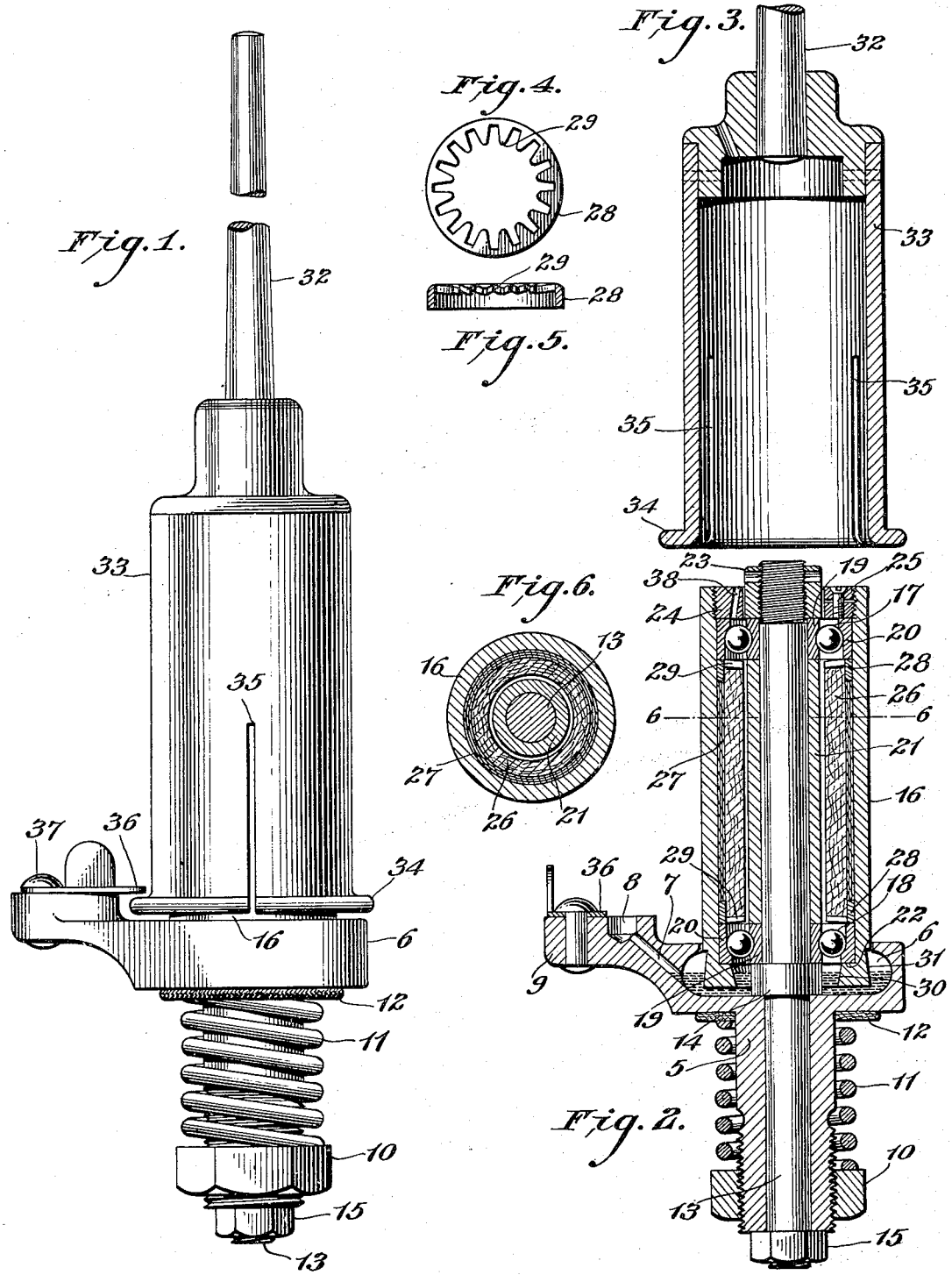

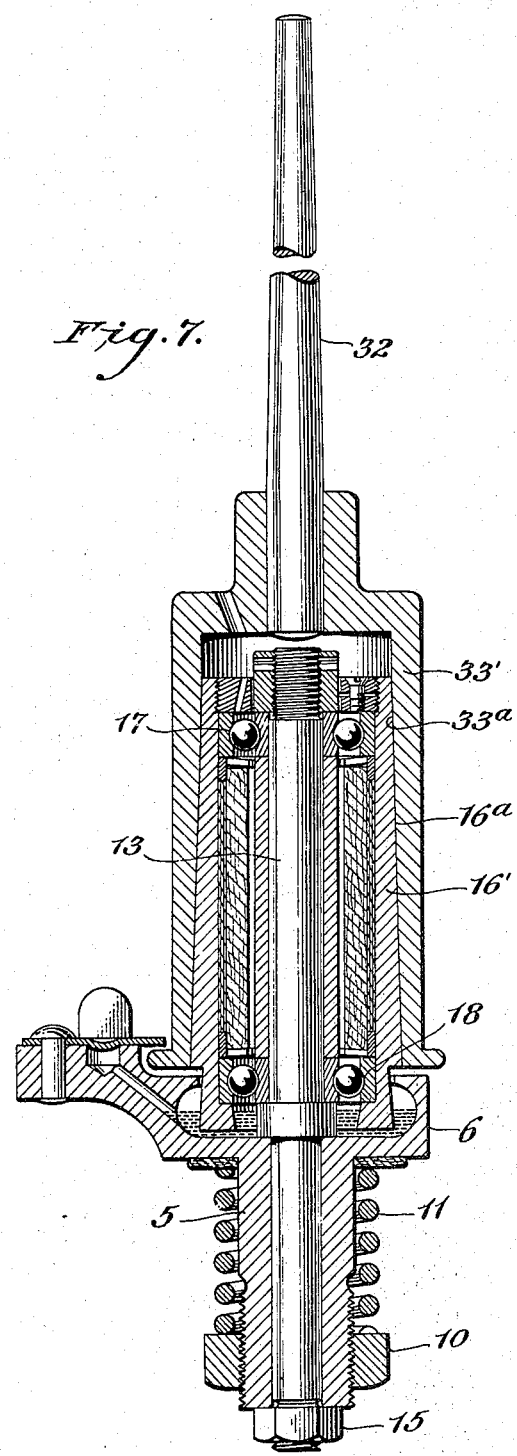
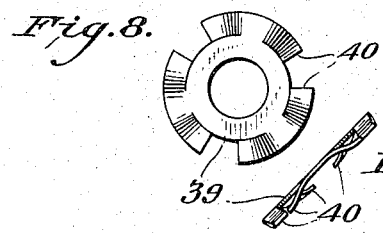
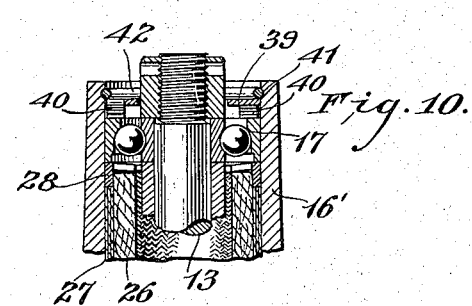
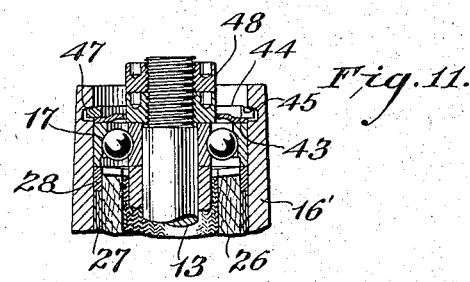
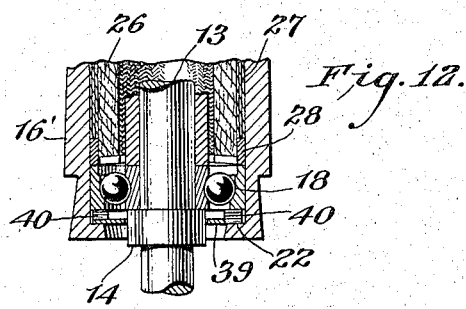

1,515,161

UNITED STATES PATENT OFFICE.

FREDERICK E. MUELLER, OF MOUNT VERNON, NEW YORK, ASSIGNOR TO NORMA-HOFFMAN BEARINGS CORPORATION, OF LONG ISLAND CITY, NEW YORK, A CORPORATION OF NEW YORK.

SPINDLE.

Application filed July 24, 1920, Serial No. 398,779. Renewed August 4, 1922. Serial No. 579,741.

*To all whom it may concern:*

Be it known that I, FREDERICK E. MUELLER, a citizen of the United States, and resident of the city of Mount Vernon, in the county of Westchester and State of New York, have invented certain new and useful Improvements in Spindles, of which the following is a description.

This invention relates to spindles, and more particularly to textile spindles, such as are commonly used on silk and cotton spinning machines.

It is the primary object of my present invention to provide a spindle for the above purpose, which is permanently mounted upon the supporting rail, and is equipped with anti-friction bearings, said spindle including a base or supporting section, and a spindle proper removable from its operative position with respect to the base section of the spindle without disturbing the anti-friction bearings.

The invention also has for a further object to provide a simple and efficient means for automatically lubricating the spaced anti-friction bearings of the spindle.

More particularly the invention consists in the provision of a rotatable sleeve mounted upon the stationary base section of the spindle, upper and lower sets of ball bearings interposed between the wall of the sleeve and said spindle section, and a spindle proper, having a tubular whorl fixed to its lower end, and adapted for detachable frictional engagement upon said sleeve.

The present improvement further comprehends a simple and reliable means for automatically adjusting the upper and lower sets of ball bearings to thereby compensate for wear of the parts.

In general, the invention provides a spindle construction having a very simple mounting and arrangement of the bearings therein, enabling the spindle to be operated at relatively high speeds, and without liability of the device getting out of order, or requiring frequent adjustment and repair.

With the above and other objects in view, the invention consists in the improved form, construction and arrangement of the relative parts as will be hereinafter more fully described, illustrated in the accompanying drawings, and subsequently incorporated in the subjoined claims.

In the drawings, wherein I have illustrated several practical and satisfactory embodiments of the invention, in which similar reference characters designate corresponding parts throughout the several views:

Figure 1 is an elevation of one embodiment of my improved spindle.

Figure 2 is a vertical sectional view through the supporting bolster for the lower spindle section and the rotatably mounted sleeve arranged on said spindle section.

Figure 3 is a longitudinal section through the spindle whorl.

Figure 4 is a plan view of one of the annular holding members for the lubricant absorbing wick.

Figure 5 is a sectional view thereof.

Figure 6 is a horizontal section taken on the line 6—6 of Figure 2.

Figure 7 is a vertical sectional view through the assembled spindle, illustrating a slightly modified construction.

Figures 8 and 9 are plan and edge views respectively of one form of spring washer for automatically adjusting the anti-friction bearings.

Figure 10 is a fragmentary vertical section through the upper end of the spindle sleeve showing the assembly of the bearing adjusting washer therein.

Figure 11 is a similar view showing a slight modification of the adjusting means for the bearings, and, Figure 12 is a fragmentary section through the lower end of the spindle sleeve, showing the spring washer of Figure 8 coacting with the lower bearing.

Referring in detail to the drawings, and more particularly to Figures 1 to 6 thereof, 5 designates the shank of a spindle supporting bolster, which is engageable through an opening in the rail of a spinning machine frame in the usual manner. This bolster is provided at the upper end of the shank 5 with an oil-receiving chamber or reservoir 6, having a feed duct 7 leading to a lubricant receiving cavity 8, formed in the laterally projecting arm 9.

The lower end of the shank 5 is threaded to receive the nut 10 engaging the lower end of the spring 11, surrounding the bolster shank. This spring at its upper end bears against the felt washer 12, which is adapted to engage the inner side of the supporting rail. It will thus be understood that by the adjustment of the nut 10, the tension of the spring 11 may be regulated. This bolster mounting is well known in the art, and constitutes no part of the present invention.

The shank 5 is provided with an axial bore to receive the lower end portion of the stationary base section 13 of the spindle, said spindle section being formed with an annular shoulder 14 engaging the base of the lubricant chamber 6. The lower end of the spindle section 13 is threaded to receive a nut 15, which is adjusted against the end of the shank 5 to thereby rigidly secure the spindle section in the bolster.

A rotatable sleeve 16 surrounds the upper portion of the spindle section 13, and upper and lower sets of ball bearings 17 and 18 respectively are interposed between the wall of this sleeve and the spindle section. These ball bearings may be of any conventional type, but in Figure 2 of the drawings I have shown an open type of bearing in which the inner and outer race rings 19 and 20 respectively are separable from each other, said rings having suitably formed races to receive the anti-friction balls. The inner ring 19 of the lower bearing 18 rests upon the shoulder 14 on the spindle section, and a spacing sleeve 21 surrounds the upper portion of the spindle section between the inner rings of the two bearings. The outer race ring 20 of the lower bearing is seated upon an internal annular shoulder 22 on the sleeve 16. A nut 23, threaded on the upper end of the spindle section, engages the inner ring 19 of the upper bearing, and an adjusting nut 24, threaded in the upper end of the sleeve 16, engages the outer race ring of said bearing. This adjusting nut has a split portion, and by the adjustment of the screw 25 connecting said split portions, the nut may be securely locked in its adjusted position within the sleeve 16.

An absorbent tubular wick 26, preferably of felt, surrounds the spacing sleeve 21, and is slightly spaced therefrom. A tubular fiber sheet 27 is frictionally engaged with the inner surface of the sleeve 16, and surrounds the wick 26. Between the ends of the tubular fiber sheet and the outer race rings 20 of the spaced bearings, the metal rings 28 are arranged, each of said rings being provided with a plurality of spaced inwardly projecting radial tongues 29, which are obliquely inclined at an acute angle with respect to the ring, as clearly shown in Figure 2. These tongues 29 of the respective rings 28 engage the opposite ends of the tubular wick 26, and hold the same against a longitudinal shifting movement, so as to prevent engagement of the ends of the wick with the parts of the anti-friction bearings, while the body portions of said rings prevent shifting movement of the fiber sheet 27.

The lower end portion of the sleeve 16 is submerged in the lubricant contained in the reservoir 6, and below the bearing 18 said sleeve is provided with an upwardly and outwardly inclined internal annular surface 30. Said lower end of the sleeve 16 is also provided with an upwardly and inwardly inclined external annular surface 31. The purpose subserved by the provision of these annular surfaces on the lower end of the spindle sleeve will be subsequently explained in detail.

The spindle proper, indicated at 32, has a tubular whorl 33 secured in any preferred manner to its lower end. The lower end of said whorl is open, and is formed with an outwardly projecting annular flange 34. The wall of the whorl 33 is longitudinally split, as at 35, from its lower open end to a point approximately midway of its length. This split section of the whorl permits of a slight yielding of the tubular wall as the whorl is inserted over the sleeve 16 and moved downwardly thereon to the position seen in Figure 1, so that the whorl will have the necessary frictional contact with the periphery of the sleeve to insure the rotation of the sleeve and the whorl as a unit. It will be understood that these contacting surfaces are very accurately machined, so that the spindle proper 32, will be axially aligned with the lower spindle section 13 when the parts of the spindle are assembled. However, it is to be understood that in lieu of the longitudinally split whorl, various other means might be adopted for detachably connecting the whorl and sleeve for unitary rotation, and in Figure 7, to be later referred to, I have indicated one such alternative construction.

The whorl 33 is locked in its applied position by means of the latch plate 36, which is pivoted, as at 37, upon the arm 9, and is adapted to be moved to the position seen in Figure 1, to close the cavity 8, and in which position one end of said latch plate projects over the flange 34 on the spindle whorl, thus preventing the upward vertical movement of the whorl with respect to the sleeve 16. In the construction illustrated in the drawing the spindle is rotated by the tangential contact of the driving belt with the periphery of the whorl 33. However, the present invention is not necessarily limited to a whorl of the particular form herein shown and if desired, the conventional type of whorl having an annular groove in and around which the belt extends through substantially 180°, may be employed, In the operation of the improved spindle construction, as above described, when the spindle is rotated by means of the drive belt engaged with the whorl 33, the oil in the chamber or reservoir 6 is directed upwardly by the inclined surface 30 on the lower end of the sleeve 16, owing to the centrifugal force thus induced, and upon the parts of the lower bearing 18. The oil passing upwardly through the bearing is absorbed by the wick 26, which finally becomes saturated, so that this wick practically subserves the purpose of a supplementary reservoir to hold a certain amount of the lubricant. In the continued rotation of the spindle, the oil held or confined by the wick is thrown outwardly by centrifugal force against the inner surface of the tubular fiber sheet 27, and there finding the limit of its outward movement, is directed upwardly and downwardly by the surface of the fiber sheet through the wick holding or retaining rings 28, and into the bearing raceways. This automatic distribution of the lubricant from the saturated wick 26 continuously supplies an adequate amount of the lubricant to the spaced bearings to insure their proper frictionless operation for an indefinite period. However, if at any time it is desirable to further lubricate the bearings, oil may be supplied through the opening 38 formed in the adjusting nut 24. Such additional supply of lubricant will be only very rarely necessary. The external annular inclined surface 31 on the lower end of the sleeve 16 serves to prevent the lubricating oil from traveling upwardly upon the outer surface of the sleeve.

In Figure 7 of the drawings I have illustrated a slightly modified form of the improved spindle, wherein the same bearing assembly as I have above described is provided, but in this construction the closed, non-separable type of ball bearing is illustrated. However, in this embodiment of the invention the sleeve 16' has an upwardly tapering external surface 16ª, while the tubular whorl 33' has a correspondingly tapered internal surface 33ª, to frictionally coact with the surface of said sleeve. Thus, when the removable whorl and upper spindle section are arranged in place, the requisite frictional coaction between the walls of the sleeve and the whorl is obtained, and the upper and lower spindle sections are automatically aligned.

In Figure 10 of the drawings I have shown an automatic adjusting means for the bearing assembly, wherein a washer plate 39 of resilient sheet metal, is provided with spaced circumferentially extending spring tongues 40. This washer plate is arranged in the upper end of the sleeve 16, with the spring tongues 40 bearing upon the outer race ring 20 of the bearing. The sleeve 16 is provided with an internal annular groove 41 to receive a split resilient ring 42, which serves to retain the washer plate 39 within the sleeve, and to maintain the spring tongues 40 under tension. It will thus be apparent that the bearings are automatically adjusted to compensate for such wear as may occur, and thereby insure the smooth and noiseless running of the spindle.

In Figure 11 I have illustrated a slightly modified form of this automatic adjusting means for the bearing, wherein a metal washer plate 43 is engaged upon the outer race ring, and is positively urged against said ring by the split clamping ring 44. This ring has an inclined annular face 45 to coact with the inclined upper surface 47 of the annular groove or channel 46 in the sleeve 16. The constant tendency of the contracted split ring 44 to expand thus maintains a wedging action between the ring and the wall of the groove 46. In this construction I have shown a lock nut 48 threaded upon the upper end of the stationary spindle section to coact with the retaining nut for the inner race ring.

In Figure 12 of the drawings I have illustrated the same form of bearing adjusting washer as is shown in Figure 8, applied to the lower bearing assembly in the sleeve 16, wherein it will be observed that the adjusting washer is interposed between the shoulder 22 on the lower end of the sleeve and the outer ring 20 of the bearing.

From the foregoing description, considered in connection with the accompanying drawings, the construction, manner of operation and several advantages of the illustrated embodiments of the invention will be fully understood.

In the various types of spindles now known in the art, the means for mounting the spindle on the supporting rail is relatively complex, and the spindle cannot be removed from the rail without considerable difficulty and loss of time. For various reasons it is occasionally necessary to detach or remove the spindle from the rail, and by means of my improved construction, wherein the spindle consists of the two separable or disconnectible parts, this removal of the thread or yarn carrying spindle may be very easily and quickly effected. Thus the lower or base section of the spindle is permanently attached to the spindle frame, and the upper spindle section 32, together with the whorl 33, may be readily lifted and detached from connection with this lower spindle section by simply swinging the latch plate 36 to its open position, and without, in any way, disturbing the bearing assembly. Owing to the simplicity of the mounting of the bearings, there is nothing to get out of order, so that it is anticipated that a spindle so constructed will operate almost indefinitely. The two sections of the spindle may also be very quickly assembled in coaxial operative relation to each other by simply reversing the manual action above described, and permitting the tubular whorl to drop downwardly around and upon the sleeve 16. By then moving the latch plate 36 to the position seen in Figure 1, the two spindle sections are locked together for proper operation.

In the foregoing description, and the accompanying drawings I have disclosed several very satisfactory embodiments of the invention, but it will, nevertheless, be understood that in practice the new spindle construction is susceptible of still further alternative constructions, and I accordingly reserve the privilege of adopting all such legitimate changes and modifications as may be fairly embodied within the spirit and scope of the invention as claimed.

I claim:

1. In a textile spindle, a fixed base spindle, a sleeve rotatably mounted upon said base spindle and a live spindle having a tubular whorl adapted to be fitted over said sleeve, and the wall of the whorl being longitudinally split to exert a frictional clamping pressure upon the periphery of the sleeve to thereby detachably retain the live spindle in coaxial relation with the base spindle.

2. In a textile spindle, a fixed base spindle, a sleeve rotatably supported upon the base spindle, a live spindle having a tubular whorl adapted to be fitted over said sleeve and said whorl being provided with radially yieldable portions for frictionally clamping engagement upon the periphery of the sleeve to detachably retain the live spindle in coaxial relation with the base spindle.

3. In a spindle, a fixed part, a rotatable part supported by said fixed part, spaced bearings interposed between said fixed and rotatable parts, lubricant receiving means carried by said rotatable part, and from which the lubricant is thrown by centrifugal force, and additional means for directing such lubricant to the spaced bearings.

4. In a spindle, a fixed part, a rotatable sleeve surrounding said fixed part, anti-friction bearings arranged between the opposite ends of the fixed part and said sleeve, means disposed within said sleeve, and rotatable therewith to hold a lubricant, and from which the lubricant is thrown by centrifugal force, and additional impact receiving means within the sleeve to distribute the lubricant upon the parts of the spaced bearings.

5. In a spindle, a fixed part, a rotatable part supported by said fixed part, an anti-friction bearing interposed between said fixed and rotatable parts, lubricant receiving means carried by said rotatable part, and from which the lubricant is thrown by centrifugal force, and additional means for directing such lubricant upon the parts of the anti-friction bearing.

6. In a spindle, a fixed part, a rotatable sleeve surrounding said fixed part, anti-friction bearings arranged between the opposite ends of the fixed part, and said sleeve, and a tubular lubricant absorbing wick disposed within said sleeve and rotatable therewith to distribute the lubricant by the action of centrifugal force upon the parts of the spaced bearings.

7. In a spindle, a fixed part, a rotatable sleeve surrounding said fixed part, anti-friction bearings arranged between the opposite ends of the fixed part and said sleeve, a tubular lubricant absorbing wick disposed within said sleeve and rotatable therewith to distribute the lubricant by the action of centrifugal force upon the parts of the spaced bearings, and means arranged within said sleeve to hold the tubular wick against longitudinal shifting movement and out of contact with the anti-friction bearings.

8. In a spindle, a fixed part, a rotatable part supported by said fixed part, spaced anti-friction bearings interposed between said fixed and rotatable parts, a lubricant reservoir, lubricant receiving means carried by said rotatable part, means on said rotatable part for directing lubricant from said reservoir to said receiving means, and additional means for directing lubricant discharged from the receiving means by centrifugal force upon the parts of the spaced bearings.

9. In a spindle, a fixed part, a rotatable part supported by said fixed part, spaced anti-friction bearings interposed between said fixed and rotatable parts, a lubricant reservoir, lubricant receiving means carried by said rotatable part, means on said rotatable part for directing lubricant from said reservoir to said receiving means, and additional means surrounding said lubricant receiving means and against which the lubricant is thrown from the receiving means by centrifugal force and whereby such lubricant is directed upon the parts of the spaced bearings.

10. In a spindle, a fixed part, a rotatable part supported by said fixed part, spaced anti-friction bearings interposed between said fixed and rotatable parts, a lubricant reservoir, a tubular absorbent wick arranged within said rotatable part for rotation therewith, means on the rotatable part to direct the lubricant from the reservoir to said wick, and a tubular sheet of non-absorbent material surrounding said wick to receive the impact of the lubricant thrown from the wick by the action of centrifugal force, whereby said lubricant is directed upon the parts of the spaced bearings.

11. In a spindle, a fixed part, a sleeve mounted upon said fixed part, anti-friction bearings interposed between the upper and lower ends of said sleeve and the fixed part, a tubular lubricant absorbing wick arranged within said sleeve and rotatable therewith, and a tubular sheet of non-absorbent material interposed between the wick and the wall of said sleeve to receive the impact of lubricant thrown from the wick by the action of centrifugal force and direct such lubricant on the parts of the spaced bearings.

12. In a spindle, a fixed part, a sleeve mounted upon said fixed part, anti-friction bearings interposed between the upper and lower ends of said sleeve and the fixed part, a tubular lubricant absorbing wick arranged within said sleeve and rotatable therewith, a tubular sheet of non-absorbent material interposed between the wick and the wall of said sleeve to receive the impact of lubricant thrown from the wick by the action of centrifugal force and direct such lubricant upon the parts of the spaced bearings, and means arranged within the sleeve and coacting with the ends of the wick and the non-absorbent material to prevent longitudinal shifting movement thereof relative to the sleeve.

13. In a spindle, a fixed part, a rotatable part surrounding the fixed part, and spaced therefrom, anti-friction bearings arranged between the opposite ends of said rotatable part and the fixed part, and parts for distributing lubricant between and upon the parts of said spaced bearings formed by the rotatable part itself.

14. In a spindle, a fixed part, a rotatable part supported by said fixed part, an anti-friction bearing interposed between the fixed and rotatable parts, and means carried by said rotatable part for automatically maintaining the parts of said bearing in proper adjustment.

15. In a spindle, a fixed part, a rotatable sleeve supported by said fixed part, an anti-friction bearing interposed between the fixed part and the rotatable sleeve, and means arranged within the sleeve and rotatable therewith, resiliently coacting with the bearing to automatically maintain the bearing parts in proper adjustment.

16. In a spindle, a fixed part, a rotatable sleeve supported by said fixed part, anti-friction bearings arranged between the upper and lower ends of the sleeve and said fixed part, and resilient means mounted within one end of the sleeve, and coacting with one of said bearings to automatically compensate for wear and maintain the bearing assembly in proper adjustment.

17. In a textile spindle, a fixed base spindle, a whorl having a live spindle, and means rotatably supporting the whorl upon said base spindle comprising spaced ball-bearings each having inner and outer race rings, said base spindle provided with a shoulder engaged by the inner race ring of one bearing, a spacing sleeve extending between said race ring and the inner race ring of the other bearing, and a nut threaded upon the base spindle and engaging the latter bearing ring and coacting therewith to rigidly fix the inner race rings of the spaced bearings in fixed positions relative to said base spindle.

18. In a spindle, a fixed part, a rotatable part supported by said fixed part, bearings interposed between opposite ends of said rotatable part and the fixed part, and lubricant distributing means for said bearings including a part common to both bearings for directing the lubricant thereto.

19. In a spindle, a fixed part, a rotatable part supported by said fixed part, bearings interposed between opposite ends of said rotatable part and the fixed part, and lubricant distributing means carried by the rotatable part and including a part common to both bearings for directing the lubricant thereto.

20. In a textile spindle, a fixed part, a rotatable sleeve, anti-friction bearings arranged within opposite ends of the sleeve, each of said bearings including an outer race ring engaged with the sleeve wall, an inner race ring mounted on said fixed part, and anti-friction members interposed between said race rings, means engaged upon said fixed part to retain the inner race rings of said bearings in properly spaced relation, and a whorl having a live spindle adapted to be detachably engaged upon said sleeve.

21. In a textile spindle, a fixed part, a rotatable sleeve, anti-friction bearings arranged within opposite ends of the sleeve, each of said bearings including an outer race ring engaged with the sleeve wall, an inner race ring mounted on said fixed part, and anti-friction members interposed between said race rings, means engaged upon said fixed part to retain the inner race rings of said bearings in properly spaced relation, means detachably engaged in the upper end of said sleeve and positioned over the space between the inner and outer rings of the bearings arranged therein, and a whorl having a live spindle adapted to be detachably engaged upon said sleeve.

22. In a spindle, a fixed part, a rotatable part surrounding said fixed part, and spaced therefrom, anti-friction bearings arranged between the opposite ends of said rotatable part and the fixed part, and washer plates of resilient sheet metal provided with spaced circumferentially extending spring tongues.

In testimony that I claim the foregoing as my invention, I have signed my name hereunder.

FREDERICK E. MUELLER.